(12) United States Patent
Allerton et al.

(10) Patent No.: US 8,504,552 B2
(45) Date of Patent: Aug. 6, 2013

(54) QUERY BASED PAGING THROUGH A COLLECTION OF VALUES

(75) Inventors: Mark Allerton, Vancouver (CA); David Michael MacLean, Vancouver (CA)

(73) Assignee: Business Objects Software Ltd., Dublin (IE)

( * ) Notice: Subject to any disclaimer, the term of this patent is extended or adjusted under 35 U.S.C. 154(b) by 1038 days.

(21) Appl. No.: 11/691,346

(22) Filed: Mar. 26, 2007

(65) Prior Publication Data
US 2008/0243762 A1    Oct. 2, 2008

(51) Int. Cl.
*G06F 17/30* (2006.01)
(52) U.S. Cl.
USPC .......................................... 707/711; 707/741
(58) Field of Classification Search
USPC .............................................................. 707/3
See application file for complete search history.

(56) References Cited

U.S. PATENT DOCUMENTS

| | | | |
|---|---|---|---|
| 5,937,408 A * | 8/1999 | Shoup et al. ........................... 1/1 |
| 6,014,656 A * | 1/2000 | Hallmark et al. ...................... 1/1 |
| 6,278,992 B1 * | 8/2001 | Curtis et al. .................. 707/711 |
| 6,374,239 B1 * | 4/2002 | Anderson et al. ................. 707/4 |
| 6,654,754 B1 * | 11/2003 | Knauft et al. .......................... 1/1 |
| 7,302,425 B1 * | 11/2007 | Bernstein et al. ................. 707/3 |
| 7,849,072 B2 * | 12/2010 | Kwak ........................... 707/711 |
| 7,925,655 B1 * | 4/2011 | Power et al. ................... 707/741 |
| 7,962,489 B1 * | 6/2011 | Chiang et al. ................. 707/741 |
| 2002/0120617 A1 * | 8/2002 | Yoshiyama et al. ............... 707/3 |
| 2005/0097083 A1 * | 5/2005 | Barsness et al. .................... 707/3 |
| 2006/0095440 A1 * | 5/2006 | Dettinger et al. ............. 707/100 |
| 2006/0106769 A1 * | 5/2006 | Gibbs ................................ 707/3 |
| 2007/0027843 A1 * | 2/2007 | Auerbach et al. ................. 707/3 |
| 2007/0050334 A1 * | 3/2007 | Deninger et al. ................. 707/3 |
| 2007/0067287 A1 * | 3/2007 | Erhard et al. ..................... 707/5 |
| 2007/0244865 A1 * | 10/2007 | Gordon et al. .................... 707/3 |
| 2008/0195583 A1 * | 8/2008 | Hsu et al. .......................... 707/3 |
| 2008/0235182 A1 * | 9/2008 | Baranczyk et al. ............... 707/2 |
| 2009/0055354 A1 * | 2/2009 | Arad ................................. 707/3 |
| 2009/0313238 A1 * | 12/2009 | Merrigan et al. ................. 707/5 |
| 2010/0161617 A1 * | 6/2010 | Cao et al. ...................... 707/741 |
| 2011/0196854 A1 * | 8/2011 | Sarkar .......................... 707/709 |
| 2011/0264646 A1 * | 10/2011 | Sokolan et al. .............. 707/711 |

OTHER PUBLICATIONS

"Optimizing Result Prefetching in Web Search Engines with Segmented Indices," by Lempel, Ronny. IN: ACM Transactions on Internet Tech., vol. 4, No. 1, pp. 31-59 (2004). Available at: ACM.*
"Location-Based Services for Dynamic Range Queries," by Park et al. IN: J'nl Comm. & Networks, vol. 7, No. 4 (2005). Available at: IEEE.*

* cited by examiner

*Primary Examiner* — Daniel Kinsaul
(74) *Attorney, Agent, or Firm* — Mintz, Levin, Cohn, Ferris, Glovsky and Popeo, P.C.

(57) ABSTRACT

A computer readable storage medium includes executable instructions to receive from a requester a query for objects within a system. An index for the objects within the system that match the query is generated. The index is segmented into pages. A set of page state queries is returned to the requester. The page state queries specify criteria for retrieving objects from segments of the index.

18 Claims, 4 Drawing Sheets

QUERY BASED PAGING THROUGH A COLLECTION OF VALUES

BRIEF DESCRIPTION OF THE INVENTION

This invention relates generally to data access and retrieval. More particularly, this invention relates to stateless paging through large sets of returned values.

BACKGROUND OF THE INVENTION

Business Intelligence (BI) generally refers to software tools used to improve business enterprise decision-making. These tools are commonly applied to financial, human resource, marketing, sales, customer and supplier analyses. More specifically, these tools can include: reporting and analysis tools to present information, content delivery infrastructure systems for delivery and management of reports and analytics, and data warehousing systems for cleansing and consolidating information from disparate sources. Business Intelligence tools work with data management systems, such as relational databases or On Line Analytic Processing (OLAP) systems used to collect, store, and manage raw data.

Business Intelligence often includes architectures for storing, accessing, and searching collections of objects such as reports, folders, users, user groups, report packages, report parts, widgets, documents, and the like which can be stored in a repository, server cache, or other medium. The stored objects can be accessed by other applications within the BI system or by applications developed to interact with the BI system through public Application Program Interfaces (APIs), custom development tools, and the like.

If a query returns a large group of objects it can be inefficient to provide the entire group of objects. Instead, segmenting the overall index of objects returned by the query into pages can make returning values for the query more manageable and efficient. However, paging through the returned values can require that an accessing application maintain values related to the "state" of the query page that it is requesting or has received. This can require additional programming logic in the accessing application, server handling requests, or additional helper logic within the API in order to maintain information about the state of the query and its returned values.

In view of the foregoing, it would be advantageous to provide an improved method and apparatus for page queries where the repository provides logic to generate a set of queries that embed query state within the query.

SUMMARY OF INVENTION

The invention includes a computer readable storage medium with executable instructions to receive from a requester a query for objects within a system. An index for the objects within the system that match the query is generated. The index is segmented into pages. A set of page state queries is returned to the requester. The page state queries specify criteria for retrieving objects from segments of the index.

The invention also includes a computer readable storage medium with executable instructions to deliver a request for objects within a system. Page state queries are received. The page state queries specify criteria for retrieving objects from a segmented index. Selected page state queries are requested. Objects corresponding to the selected page state queries are then received.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
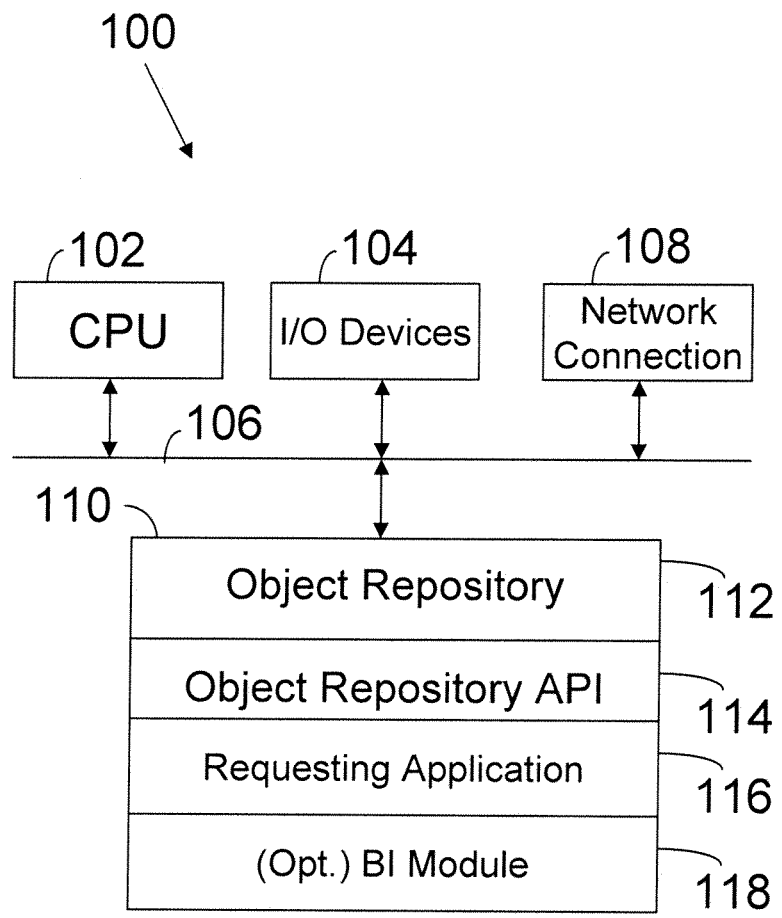
FIG. 1 illustrates a computer constructed in accordance with an embodiment of the invention.

FIG. 1 illustrates a computer 100 configured in accordance with an embodiment of the invention. The computer 100 includes standard components, including a central processing unit 102 and input/output devices 104, which are linked by a bus 106. The input/output devices 104 may include a keyboard, mouse, touch screen, monitor, printer, and the like. A network connection or a interface circuit 108 is also connected to the bus 106. The network interface circuit (NIC) 108 provides connectivity to a network (not shown), thereby allowing the computer 100 to operate in a networked environment.

A memory 110 is also connected to the bus 106. In an embodiment, the memory 110 stores one or more of the following modules: an object repository module 112, an object repository Application Program Interface (API) 114, a requesting application 116, and an optional Business Intelligence (BI) module 118.

The object repository module 112 stores a collection of objects and provides access to the objects. The objects themselves may be stored in one or more separate data sources (not shown) with the object repository providing logic for querying and accessing those objects. In one embodiment of the invention, the objects are associated with a BI system and include folders, reports, analytics, users, user groups, publication schedules, documents, report packages, data source connection strings, servers, and the like. The object repository has an associated API 114 that enables applications and code, for example other applications within a BI system, to call the functions of the object repository 112 and query the object repository 112 for objects within the system. In one embodiment of the invention, this object repository API 114 is a public API that can be used by third party applications and program code to access objects within the object repository 112. The requesting application 116 can be a segment of code or a fully functional application. The requesting application can be an application within a BI system, or another type of application including third party custom applications. The optional BI module 118 includes executable instructions to perform BI related functions, such as, generate reports, perform queries and analyses, and the like.

The executable modules stored in memory 110 are exemplary. Additional modules such as an operating system or graphical user interface module can be included. It should be appreciated that the functions of the modules may be combined. In addition, the functions of the modules need not be performed on a single machine. Instead, the functions may be distributed across a network, if desired. Indeed, the invention is commonly implemented in a client-server environment with various components being implemented at the client-side and/or the server-side. It is the functions of the invention that are significant, not where they are performed or the specific manner in which they are performed.

Figure 2:
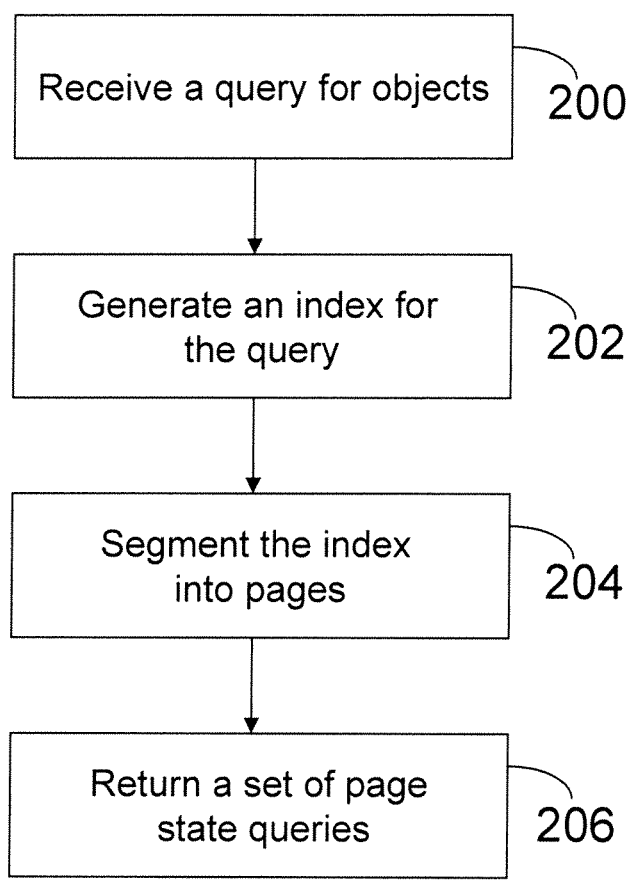
FIG. 2 illustrates processing operations associated with generating page state queries in accordance with an embodiment of the invention.

FIG. 2 illustrates a series of processing operations that may be implemented by the computer 100 of FIG. 1, and more specifically, by the object repository 112 in conjunction with the object repository API 114. The first processing operation of FIG. 2 is to receive a query for objects 200. The query may be in any form. For example, the query may be a simple select type query that requests all objects. Alternately, the query may have more complex logic (e.g., where conditions, ordering of returned values, specifications for properties associated with the object that will be displayed, and specifications for the display of the query result set, such as the page size, and the like). This logic may be either specified within the query, specified by default values associated with the functions used to construct the query, or specified by default values or preferences set at the object repository 112. In the pseudo code example of Table A1 below, AA specifies a string for a Uniform Resource Identifier (URI), which is a unique identifier for a location and can be a Uniform Resource Locator (URL) in an internet or other path format. The pseudo code segment for the query below shows a complex query AA that requests objects below the root folder and specifies that they be ordered by the object type (SI_KND) starting with folders and then by the object description name (SI_NAME DESC) and then by ID (SI_ID). The ordering is alphabetical/numerical ordering in descending order, as specified by the object repository ordering logic. The properties associated with the objects that will be displayed, object type (SI_KIND), object name (SI_NAME), and object ID (SI_ID) are also specified within the query.

Line AB of the query specifies that the page size should be 7 objects. Lines AC-AF set up the new sample query using the values specified in AA and AB.

TABLE A1

Pseudo Code Segment for Query

| | |
|---|---|
| AA | String uri = "path://InfoObjects/Root Folder/**?OrderBy= SI_KIND Custom('Folder'), SI_NAME DESC, SI_ID"; String[ ] displayProps = { "SI_KIND", "SI_NAME", "SI_ID"}; |

TABLE A1-continued

Pseudo Code Segment for Query

| | |
|---|---|
| AB | int pageSize = 7; |
| AC | URISampleCode sample = new URISampleCode(); |
| AD | sample.displayURIResults(uri, displayProps, pageSize); |
| AE | public void displayURIResults(String uri, String[ ] displayProps, int pageSize) |
| AF | StatelessPagingQueryOptions options = new StatelessPagingQueryOptions(pageSize); |

When the object repository receives the query it generates an index for the query 202 that includes the object repository objects that match the query request. This index includes the objects that match criteria (e.g., a select, where, and optionally ordering clauses) found within the initial client query. The index is then segmented into pages 204. Subsequently, a set of page state queries are returned 206.

Segmenting can be based on an explicit value for items within a page set within the query, such as the value "7" in line AB above, a total number of pages to return, an optimization performed based on the requesting application type, default values or preferences set at the object repository or within the API, and the like. Based on the page segments calculated, the object repository returns a set of page state queries.

The object repository 112 produces a set of stateless page queries for the query and page specifications provided by the requesting application 116. In the pseudo code example of Table B1 below, global values are returned in line BA for the query, which include values such as the initial URI path query, the size of the result set, the size of each page and the number of pages within the query result. For each page, two types of stateless page based queries can be generated that represent the logic required to retrieve the objects on that page. A URI based specification of the stateless page defines the query in terms of the values to be retrieved for specific resource locations based on specific folder and file names. A SQL based specification of the stateless page defines the query in terms of the values to be retrieved related to query logic and object properties. For example, both BB (a URI based specification) and BC (a SQL based specification) describe returning the same objects from the object repository to populate page 1 of the set of pages associated with the query. The remaining code in the example of Table B1 characterizes the remaining pages.

TABLE B1

Pseudo Code Segment Returned for Stateless Page URIs

| | |
|---|---|
| BA | Initial URI: path://InfoObjects/Root Folder/**?OrderBy=SI_KIND Custom('Folder'), SI_NAME DESC, SI_ID<br>Result Size: 40<br>Page Size: 7<br>Page Count: 6 |
| BB | Page 1 URI: path://InfoObjects/Root Folder/**?OrderBy=SI_KIND Custom('Folder'), SI_NAME DESC, SI_ID&BIP1=SI_KIND&From1=Folder&To1=Folder&Asc1=custom&CustomBoundValue1_1=Folder&BIP2=SI_NAME&From2=Tutorials&To2=General Business&Asc2=false&BIP3=SI_ID&From3=1245&To3=1093&Asc3=true |
| BC | Page 1 SQL: SELECT SI_CUID,SI_NAME,SI_PARENT_CUID,SI_DESCRIPTION,SI_CREATION_TIME, SI_KIND,SI_CHILDREN,SI_OWNER,SI_PATH,SI_CORPORATE_CATEGORIES_ID, SI_PERSONAL_CATEGORIES_ID,SI_FILES,SI_INSTANCE,SI_SCHEDULE_STATUS, SI_LAST_SUCCESSFUL_INSTANCE_ID,SI_KEYWORD FROM CI_INFOOBJECTS WHERE ((SI_ANCESTOR IN (23) AND NOT SI_PARENTID IN (49)) AND ((NOT SI_KIND IN ('Folder')) OR (SI_KIND = 'Folder' AND SI_NAME<'Tutorials') OR (SI_KIND = 'Folder' AND SI_NAME='Tutorials' AND SI_ID>='1245')) AND ((SI_KIND = 'Folder' AND SI_NAME>'General Business') OR (SI_KIND = 'Folder' AND |

TABLE B1-continued

Pseudo Code Segment Returned for Stateless Page URIs

|     |     |
| --- | --- |
|     | SI_NAME='General Business' AND SI_ID<='1093'))) ORDER BY SI_KIND Custom('Folder'), SI_NAME DESC, SI_ID |
| BD  | Page 2 URI: path://InfoObjects/Root Folder/\*\*?OrderBy=SI_KIND Custom('Folder'), SI_NAME DESC, SI_ID&BIP1=SI_KIND&From1=Folder&To1=CrystalReport&Asc1=custom&Custom BoundValue1_1=Folder&BIP2=SI_NAME&From2=Financial&To2=Trial Balance&Asc2=false&BIP3=SI_ID&From3=1064&To3=1085&Asc3=true |
| BE  | Page 2 SQL: SELECT TOP 1000 SI_CUID,SI_NAME,SI_PARENT_CUID,SI_DESCRIPTION,SI_CREATION_TIME, SI_KIND,SI_CHILDREN,SI_OWNER,SI_PATH,SI_CORPORATE_CATEGORIES_ID, SI_PERSONAL_CATEGORIES_ID,SI_FILES,SI_INSTANCE,SI_SCHEDULE_STATUS, SI_LAST_SUCCESSFUL_INSTANCE_ID,SI_KEYWORD FROM CI_INFOOBJECTS WHERE (((NOT SI_KIND IN ('Folder')) OR (SI_KIND = 'Folder' AND SI_NAME<'Financial') OR (SI_KIND = 'Folder' AND SI_NAME='Financial' AND SI_ID>='1064')) AND ((SI_KIND IN ('Folder')) OR (NOT SI_KIND IN ('Folder') AND SI_NAME>'Trial Balance') OR (NOT SI_KIND IN ('Folder') AND SI_NAME='Trial Balance' AND SI_ID<='1085'))) AND ((SI_ANCESTOR IN (23) AND NOT SI_PARENTID IN (49))) ORDER BY SI_KIND Custom('Folder'), SI_NAME DESC, SI_ID |
| BF  | Page 3 URI: path://InfoObjects/Root Folder/\*\*?OrderBy=SI_KIND Custom('Folder'), SI_NAME DESC, SI_ID&BIP1=SI_KIND&From1=CrystalReport&To1=CrystalReport&Asc1=custom &CustomBoundValue1_1=Folder&BIP2=SI_NAME&From2=Sorted Variance Analysis Report&To2=OLAP Cube Report&Asc2=false&BIP3=SI_ID&From3=1081&To3=882&Asc3=true |
| BG  | Page 3 SQL: SELECT TOP 1000 SI_CUID,SI_NAME,SI_PARENT_CUID,SI_DESCRIPTION,SI_CREATION_TIME, SI_KIND,SI_CHILDREN,SI_OWNER,SI_PATH,SI_CORPORATE_CATEGORIES_ID, SI_PERSONAL_CATEGORIES_ID,SI_FILES,SI_INSTANCE,SI_SCHEDULE_STATUS, SI_LAST_SUCCESSFUL_INSTANCE_ID,SI_KEYWORD FROM CI_INFOOBJECTS WHERE (((NOT SI_KIND IN ('Folder') AND SI_NAME<'Sorted Variance Analysis Report') OR (NOT SI_KIND IN ('Folder') AND SI_NAME='Sorted Variance Analysis Report' AND SI_ID>='1081')) AND ((SI_KIND IN ('Folder')) OR (NOT SI_KIND IN ('Folder') AND SI_NAME>'OLAP Cube Report') OR (NOT SI_KIND IN ('Folder') AND SI_NAME='OLAP Cube Report' AND SI_ID<='882'))) AND ((SI_ANCESTOR IN (23) AND NOT SI_PARENTID IN (49))) ORDER BY SI_KIND Custom('Folder'), SI_NAME DESC, SI_ID |
| BH  | Page 4 URI: path://InfoObjects/Root Folder/\*\*?OrderBy=SI_KIND Custom('Folder'), SI_NAME DESC, SI_ID&BIP1=SI_KIND&From1=ObjectPackage&To1=CrystalReport&Asc1=custom &CustomBoundValue1_1=Folder&BIP2=SI_NAME&From2=Navigation Package&To2=How to group data&Asc2=false&BIP3=SI_ID&From3=1246&To3=874&Asc3=true |
| BI  | Page 4 SQL: SELECT TOP 1000 SI_CUID,SI_NAME,SI_PARENT_CUID,SI_DESCRIPTION,SI_CREATION_TIME, SI_KIND,SI_CHILDREN,SI_OWNER,SI_PATH,SI_CORPORATE_CATEGORIES_ID, SI_PERSONAL_CATEGORIES_ID,SI_FILES,SI_INSTANCE,SI_SCHEDULE_STATUS, SI_LAST_SUCCESSFUL_INSTANCE_ID,SI_KEYWORD FROM CI_INFOOBJECTS WHERE (((NOT SI_KIND IN ('Folder') AND SI_NAME<'Navigation Package') OR (NOT SI_KIND IN ('Folder') AND SI_NAME='Navigation Package' AND SI_ID>='1246')) AND ((SI_KIND IN ('Folder')) OR (NOT SI_KIND IN ('Folder') AND SI_NAME>'How to group data') OR (NOT SI_KIND IN ('Folder') AND SI_NAME='How to group data' AND SI_ID<='874'))) AND ((SI_ANCESTOR IN (23) AND NOT SI_PARENTID IN (49))) ORDER BY SI_KIND Custom('Folder'), SI_NAME DESC, SI_ID |
| BJ  | Page 5 URI: path://InfoObjects/Root Folder/\*\*?OrderBy=SI_KIND Custom('Folder'), SI_NAME DESC, SI_ID&BIP1=SI_KIND&From1=CrystalReport&To1=CrystalReport&Asc1=custom &CustomBoundValue1_1=Folder&BIP2=SI_NAME&From2=How to create roup selection based on countries with sales based on the parameter alues&To2=Custom Functions emo&Asc2=false&BIP3=SI_ID&From3=870&To3=862&Asc3=true |
| BK  | Page 5 SQL: SELECT TOP 1000 SI_CUID,SI_NAME,SI_PARENT_CUID,SI_DESCRIPTION,SI_CREATION_TIME, SI_KIND,SI_CHILDREN,SI_OWNER,SI_PATH,SI_CORPORATE_CATEGORIES_ID, SI_PERSONAL_CATEGORIES_ID,SI_FILES,SI_INSTANCE,SI_SCHEDULE_STATUS, SI_LAST_SUCCESSFUL_INSTANCE_ID,SI_KEYWORD FROM CI_INFOOBJECTS WHERE (((NOT SI_KIND IN ('Folder') AND SI_NAME<'How to create group selection based on countries with sales based on the parameter values') OR (NOT SI_KIND IN ('Folder') AND SI_NAME='How to create group selection based on countries with sales based on the parameter values' AND SI_ID>='870')) AND ((SI_KIND IN ('Folder')) OR (NOT SI_KIND IN ('Folder') AND SI_NAME>'Custom Functions Demo') OR (NOT SI_KIND IN ('Folder') AND SI_NAME='Custom Functions Demo' AND SI_ID<='862'))) AND ((SI_ANCESTOR IN (23) AND NOT SI_PARENTID IN (49))) ORDER BY SI_KIND Custom('Folder'), SI_NAME DESC, SI_ID |

TABLE B1-continued

Pseudo Code Segment Returned for Stateless Page URIs

BL  Page 6 URI: path://InfoObjects/Root Folder/**?OrderBy=SI_KIND
Custom('Folder'), SI_NAME DESC,
SI_ID&BIP1=SI_KIND&From1=CrystalReport&To1=CrystalReport&Asc1=custom
&CustomBoundValue1_1=Folder&BIP2=SI_NAME&From2=Consolidated
Income
Statement&To2=Accessibility&Asc2=false&BIP3=SI_ID&From3=1065&To3=846
&Asc3=true BM  Page 6 SQL: SELECT TOP 1000
SI_CUID,SI_NAME,SI_PARENT_CUID,SI_DESCRIPTION,SI_CREATION_TIME,
SI_KIND,SI_CHILDREN,SI_OWNER,SI_PATH,SI_CORPORATE_CATEGORIES_ID,
SI_PERSONAL_CATEGORIES_ID,SI_FILES,SI_INSTANCE,SI_SCHEDULE_STATUS,
SI_LAST_SUCCESSFUL_INSTANCE_ID,SI_KEYWORD
FROM CI_INFOOBJECTS WHERE (((NOT SI_KIND IN ('Folder') AND
SI_NAME<'Consolidated Income Statement') OR (NOT SI_KIND IN ('Folder')
AND SI_NAME='Consolidated Income Statement' AND SI_ID>='1065')) AND
((SI_KIND IN ('Folder')) OR (NOT SI_KIND IN ('Folder') AND
SI_NAME>'Accessibility') OR (NOT SI_KIND IN ('Folder') AND
SI_NAME='Accessibility' AND SI_ID<='846'))) AND ((SI_ANCESTOR IN (23)
AND NOT SI_PARENTID IN (49))) ORDER BY SI_KIND Custom('Folder'),
SI_NAME DESC, SI_ID The client request for the index query and to return a list of pages and the contents of the first page may be specified with the following pseudo code of Table A2.

TABLE A2

Pseudo Code Segment for Index Query and List of Pages

AG  IStatelessPageResult firstPage =
    m_infoStore.getStatelessPagingQuery(uri, options);
AH  int resultSize = firstPage.getResultSize( );
AI  int pageCount = firstPage.getPageCount( );
AJ  System.out.println("Initial URI: " + uri);
AK  System.out.println("Result Size: " + resultSize);
AL  System.out.println("Page Size: " + pageSize);
AM  System.out.println("Page Count: " + pageCount);
AN  StatelessPageResult currentPage = firstPage;

TABLE A2-continued

Pseudo Code Segment for Index Query and List of Pages

AO  String nextURI = null;
AP  String nextSQL = null;

The following code of Table C1 lists the objects returned in response to the query. Each page (1 through 6) is represented by a set of objects CA-CF. As requested by the query, folders are returned first and objects are listed in reverse alphabetical order based on description. Each page contains 7 (0 through 6) objects, as specified by the page size in the query, except for the final page, which contains the five remaining objects to fulfill the query. For each object, the specified properties are displayed, in this case the type of object ("SI_KIND"), the name of the object ("SI_NAME"), and the ID for the object ("SI_ID").

TABLE C1

Example Objects Returned for Stateless Page URIs

CA  Page 1 Objects:
    0) {'Folder', 'Tutorials', '1245'}
    1) {'Folder', 'Report Samples', '843'}
    2) {'Folder', 'Report Conversion Tool Temporary Documents', '189'}
    3) {'Folder', 'Report Conversion Tool Documents', '191'}
    4) {'Folder', 'Report Conversion Tool Audit Documents', '193'}
    5) {'Folder', 'Report Conversion Tool', '190'}
    6) {'Folder', 'General Business', '1093'}
CB  Page 2 Objects:
    0) {'Folder', 'Financial', '1064'}
    1) {'Folder', 'Feature Samples', '844'}
    2) {'Folder', 'Feature Examples', '845'}
    3) {'CrystalReport', 'Year to Date Statement of Cash Flow', '1069'}
    4) {'CrystalReport', 'World Sales Report', '1241'}
    5) {'CrystalReport', 'Variance Analysis Report', '1089'}
    6) {'CrystalReport', 'Trial Balance', '1085'}
CC  Page 3 Objects:
    0) {'CrystalReport', 'Sorted Variance Analysis Report', '1081'}
    1) {'CrystalReport', 'Rolling Quarter Income Statement', '1077'}
    2) {'CrystalReport', 'Record Selection on Date Range', '1056'}
    3) {'CrystalReport', 'Product Catalogue', '1233'}
    4) {'CrystalReport', 'Order Processing Efficiency Dashboard', '1186'}
    5) {'CrystalReport', 'Order Packing List', '1182'}
    6) {'CrystalReport', 'OLAP Cube Report', '882'}
CD  Page 4 Objects:
    0) {'ObjectPackage', 'Navigation Package', '1246'}
    1) {'CrystalReport', 'Mail Labels', '1178'}
    2) {'CrystalReport', 'Inventory Cross-Tab Report by Product Type & Supplier', '1174'}

TABLE C1-continued

Example Objects Returned for Stateless Page URIs

3) {'CrystalReport', 'How To Use Dynamic Cascading Prompting', '891'}
4) {'CrystalReport', 'How to maintain running totals for a group', '1060'}
5) {'CrystalReport', 'How to group data in intervals', '866'}
6) {'CrystalReport', 'How to group data', '874'}
CE Page 5 Objects:
   0) {'CrystalReport', 'How to create group selection based on countries with sales based on the parameter values', '870'}
1) {'CrystalReport', 'Hierarchical Grouping', '878'}
2) {'CrystalReport', 'Geographic Sales Report', '1237'}
3) {'CrystalReport', 'Full Year Budget Report with Actuals', '1073'}
4) {'CrystalReport', 'Employee Sales (Quarterly Report)', '1098'}
5) {'CrystalReport', 'Employee Profile (Alphabetical with Employee Picture)', '1094'}
6) {'CrystalReport', 'Custom Functions Demo', '862'}
   CF Page 6 Objects:
0) {'CrystalReport', 'Consolidated Income Statement', '1065'}
1) {'CrystalReport', 'Charting', '854'}
2) {'CrystalReport', 'Alerting Report', '850'}
3) {'CrystalReport', 'Add new formatting features to your cross-tab', '858'}
4) {'CrystalReport', 'Accessibility', '846'}

Figure 3:
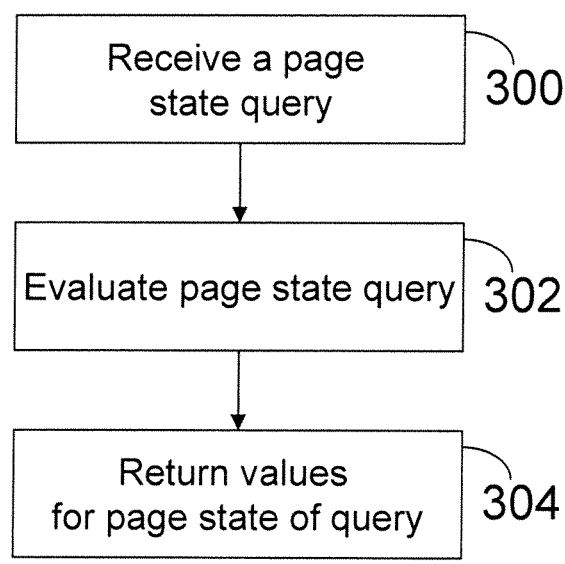
FIG. 3 illustrates processing operations evaluating page state queries in accordance with an embodiment of the invention.

FIG. 3 illustrates a series of processing operations that may be implemented by the computer 100 of FIG. 1, and more specifically by the object repository in conjunction with the object repository API 114. The first processing operation is to receive a page state query 300. This page state query may be one or more of the queries returned in processing operation 206 of FIG. 2. A page state query is then evaluated 302. This may include evaluating either a URI, SQL, or a combined type query. Evaluating the query occurs against the object repository 112 and does not require that the index generated in FIG. 2 processing operation 202, or segmentation generated in FIG. 2 processing operation 204 be persisted in memory. The page state query contains within its own query specification the information required to reconstruct the page. Values for the page state of the query are returned 304. This operation returns the values associated with the one or more page state queries received in processing operation 300. Values associated with one or more pages are returned to the requesting application.

Figure 4:
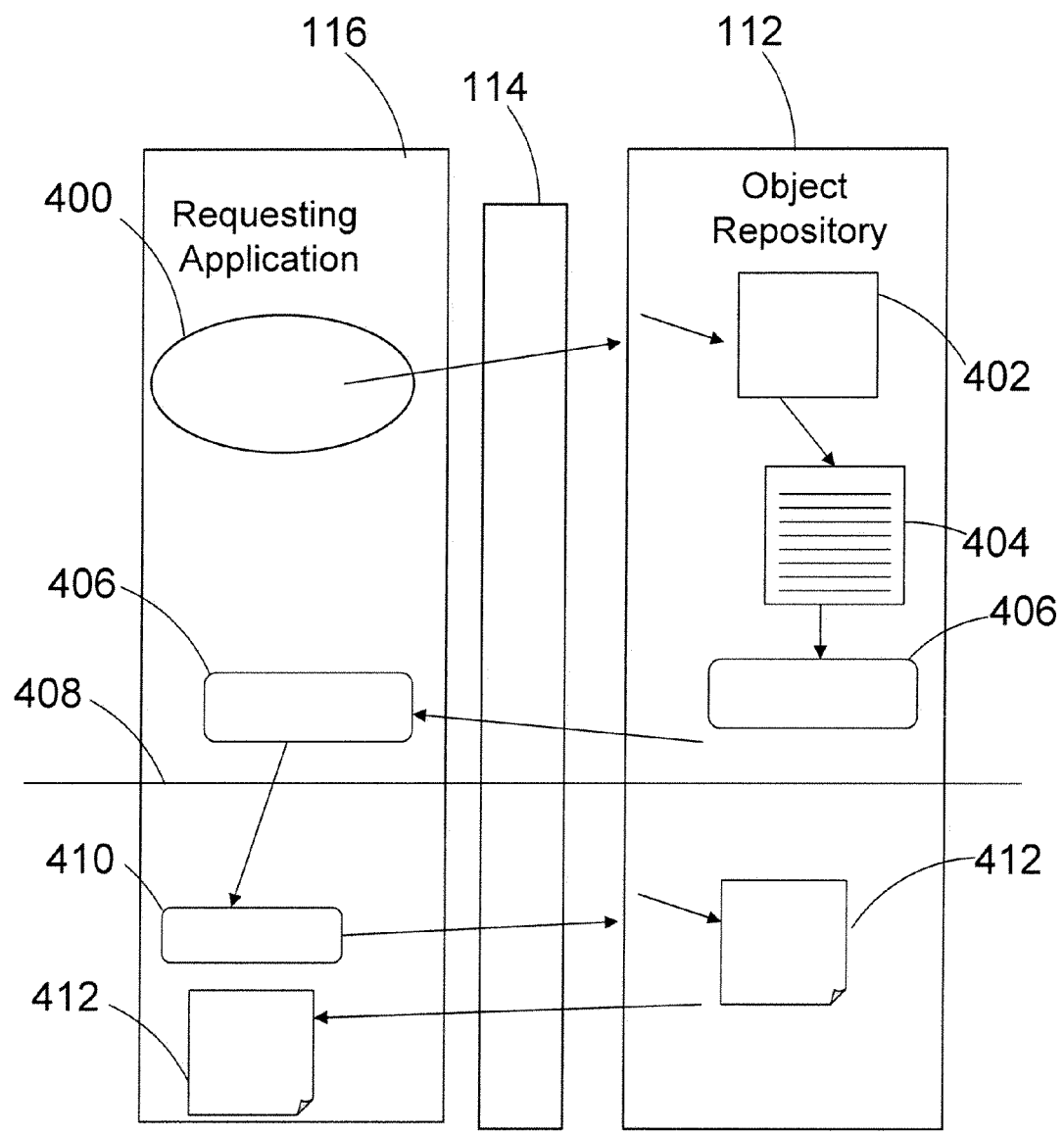
FIG. 4 illustrates the interaction between the requesting application and the object repository in accordance with an embodiment of the invention.

FIG. 4 illustrates the interaction between the requesting application 116 and the object repository 112 in accordance with an embodiment of the invention. The requesting system 116 passes an initial query 400 to the object repository 112 via the API 114. The object repository evaluates the query and generates an index 402 that contains the query results. The query results are then divided into a segmented index 404 that contains pages that match the criteria for dividing the query results specified by the initial query 400, default values in the API 114, or default values or preferences set at the object repository 112. Based on the segmented index 404, the object repository generates a set of page state queries 406 that represent the query required to retrieve the set of objects for each page within the segmented index. Each page state query specifies boundary values for returned objects. The page state queries 406 are returned to the requesting system 116. The requesting system 116 can then select one or more of the state queries to pass to the object repository 112. The object repository evaluates the specific query which is specified by the page state query 410 and returns the objects specified by the query 412. These objects 412 are then returned to the requesting system 116. Line 408 indicates a break in the workflow. The index 402 and segmented index 404 are not used when evaluating the page state query 410, rather the logic to construct the index segment is contained within the page state query.

In one embodiment of the invention, the page state query has metadata such as a date/time stamp associated with or contained within it and the evaluation of the page state query includes checking whether the page state query is stale and providing a warning or requiring the regeneration of the set of page state queries. In one embodiment of the invention, an initial query is generated based on a search term and is processed in order to generate a set of page state queries. When the query is generated from a search term, the page state query may include or reference specific information based on the search and use this information to validate the resulting page state queries when they are passed to the object repository for evaluation.

An embodiment of the present invention relates to a computer storage product with a computer-readable medium having computer code thereon for performing various computer-implemented operations. The media and computer code may be those specially designed and constructed for the purposes of the present invention, or they may be of the kind well known and available to those having skill in the computer software arts Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A non-transitory computer readable storage medium, comprising executable instructions executed by a machine, wherein the executable instructions include executable instructions to:
   receive from a requester a query for objects within a system;
   in response to the query, generate an index for the query, wherein the index includes objects within the system that match the query, wherein the index follows an order associated with the query;
   segment the index into pages to generate a segmented index;
   return a set of page state queries, wherein the page state queries specify:
      criteria for retrieving the objects from the system in pages corresponding to segments of the segmented index, wherein the criteria for retrieving the objects is expressed both as a Uniform Resource Identifier (URI) with specific folder and file names and as a Structured Query Language (SQL) expression with query logic and object properties, and
      boundary values for the objects in the system that correspond to the boundaries of the segments of the segmented index;
   receive selected page state queries, each page state query comprising information to reconstruct at least one page;
   evaluate the selected page state queries independent of the index and the segmented index by checking whether each page state query is stale and providing (i) a warning or (ii) requiring regeneration of at least one page state query; and
   deliver objects that match the query and correspond to the selected page state queries.

2. The computer readable storage medium of claim 1 wherein the executable instructions further comprise executable instructions to query for three or more object types selected from the following object types: folders, reports, analytics, users, user groups, publication schedules, documents, report packages, data source connection strings, and servers.

3. The computer readable storage medium of claim 1 wherein the executable instructions further comprise executable instructions to receive a search term and generate the query based on the search term.

4. The computer readable storage medium of claim 1 further comprising executable instructions to validate the page state query based on a time stamp.

5. The computer readable storage medium of claim 1 further comprising executable instructions to validate the page state query based on metadata associated with the page state query.

6. The computer readable storage medium of claim 1 wherein the executable instructions to receive from a requester a query include executable instructions to receive the query through an application program interface.

7. A method for implementation by one or more data processors of at least one computing system, the method comprising:
   receiving, by at least one data processor, from a requester a query for objects within a system;
   in response to the query, generating, by at least one data processor, an index for the query, wherein the index includes objects within the system that match the query, wherein the index follows an order associated with the query;
   segmenting, by at least one data processor, the index into pages to generate a segmented index;
   returning, by at least one data processor, a set of page state queries, wherein the page state queries specify:
      criteria for retrieving the objects from the system in pages corresponding to segments of the segmented index, wherein the criteria for retrieving the objects is expressed both as a Uniform Resource Identifier (URI) with specific folder and file names and as a Structured Query Language (SQL) expression with query logic and object properties, and
      boundary values for the objects in the system that correspond to the boundaries of the segments of the segmented index;
   receiving, by at least one data processor, selected page state queries, each page state query comprising information to reconstruct at least one page;
   evaluating, by at least one data processor, the selected page state queries independent of the index and the segmented index by checking whether each page state query is stale and providing (i) a warning or (ii) requiring regeneration of at least one page state query; and
   delivering, by at least one data processor, objects that match the query and correspond to the selected page state queries.

8. The method of claim 7, wherein the objects specified by the query comprise three or more objects selected from a group consisting of: folders, reports, analytics, users, user groups, publication schedules, documents, report packages, data source connection strings, and servers.

9. The method of claim 7, further comprising:
   receiving, by at least one data processor, a search term; and
   generating, by at least one data processor, the query based on the search term.

10. The method of claim 7, further comprising:
   validating, by at least one data processor, the page state query based on a time stamp.

11. The method of claim 7, further comprising:
   validating, by at least one data processor, the page state query based on metadata associated with the page state query.

12. The method of claim 7, wherein the query is received through an application program interface.

13. A system comprising:
at least one data processor; and
memory storing instructions, which when executed by at least one data processor,
result in operations comprising:
   receiving from a requester a query for objects within a system;
   in response to the query, generating an index for the query, wherein the index includes objects within the system that match the query, wherein the index follows an order associated with the query;
   segmenting the index into pages to generate a segmented index;
   returning a set of page state queries, wherein the page state queries specify:
      criteria for retrieving the objects from the system in pages corresponding to segments of the segmented index, wherein the criteria for retrieving the objects is expressed both as a Uniform Resource Identifier (URI) with specific folder and file names and as a Structured Query Language (SQL) expression with query logic and object properties, and boundary values for the objects in the system that correspond to the boundaries of the segments of the segmented index;

receiving selected page state queries, each page state query comprising information to reconstruct at least one page;

evaluating the selected page state queries independent of the index and the segmented index by checking whether each page state query is stale and providing (i) a warning or (ii) requiring regeneration of at least one page state query; and delivering objects that match the query and correspond to the selected page state queries.

14. The system of claim 13, wherein the objects specified by the query comprise three or more objects selected from a group consisting of: folders, reports, analytics, users, user groups, publication schedules, documents, report packages, data source connection strings, and servers.

15. The system of claim 13, wherein the operations further comprise:
receiving a search term; and
generating the query based on the search term.

16. The system of claim 13, wherein the operations further comprise: validating the page state query based on a time stamp.

17. The system of claim 13, wherein the operations further comprise: validating the page state query based on metadata associated with the page state query.

18. The system of claim 13, wherein the query is received through an application program interface.

\* \* \* \* \*